(12) United States Patent
Zhong

(10) Patent No.: US 9,395,579 B2
(45) Date of Patent: Jul. 19, 2016

(54) COLOR LIQUID CRYSTAL DISPLAY PANEL

(71) Applicant: Shenzhen China Star Optoelectronics Technology Co., Ltd., Shenzhen, Guangdong (CN)

(72) Inventor: Xinhui Zhong, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 156 days.

(21) Appl. No.: 14/236,709

(22) PCT Filed: Dec. 2, 2013

(86) PCT No.: PCT/CN2013/088360
§ 371 (c)(1),
(2) Date: Feb. 3, 2014

(87) PCT Pub. No.: WO2015/078027
PCT Pub. Date: Jun. 4, 2015

(65) Prior Publication Data
US 2015/0192828 A1 Jul. 9, 2015

(30) Foreign Application Priority Data
Nov. 28, 2013 (CN) .......................... 2013 1 0626199

(51) Int. Cl.
*G02F 1/1347* (2006.01)
*G02F 1/1335* (2006.01)
(Continued)

(52) U.S. Cl.
CPC ........ *G02F 1/133621* (2013.01); *C09K 19/586* (2013.01); *C09K 19/60* (2013.01);
(Continued)

(58) Field of Classification Search
CPC ............ G02F 1/133621; G02F 1/1396; G02F 1/1397; G02F 1/1347; G02F 1/13471–1/13476; G02F 1/13718; G02F 1/13725; G02F 1/13737; G02F 2203/34; C09K 19/60
USPC ..................................................... 349/185, 73
See application file for complete search history.

(56) References Cited

U.S. PATENT DOCUMENTS 5,712,695 A    1/1998  Tanaka et al.
5,936,693 A *  8/1999  Yoshida ............ G02F 1/134336
                                                349/106
(Continued)

FOREIGN PATENT DOCUMENTS

CN    101501559 A    8/2009
CN    101644845 A    2/2010
(Continued)

*Primary Examiner* — Paul Lee
*Assistant Examiner* — Jia Pan
(74) *Attorney, Agent, or Firm* — Andrew C. Cheng

(57) ABSTRACT

A color liquid crystal display panel includes: a plurality of layers of liquid crystal cells that are arranged parallel to each other and bonding members bonding the plurality of layers of liquid crystal cells. Each of the liquid crystal cells includes a thin-film transistor substrate, a package substrate, and a dye-doped liquid crystal layer sealed between the thin-film transistor substrate and the package substrate. The dye-liquid crystal layer includes a liquid crystal material, a dichroic dye, and a chiral reagent. The dichroic dye of each of the liquid crystal cells absorbs light of a predetermined range of wavelength. The plurality of layers of liquid crystal cell respectively absorbs lights of different ranges of wavelength. The color liquid crystal display panel requires no conventionally used polarizer and color filter, so that the manufacture cost of and the requirement for backlighting brightness by the liquid crystal display panel can both be reduced.

15 Claims, 11 Drawing Sheets

(51) Int. Cl.

| | | |
|---|---|---|
| *G02F 1/139* | (2006.01) | |
| *C09K 19/58* | (2006.01) | |
| *C09K 19/60* | (2006.01) | |
| *G02F 1/1337* | (2006.01) | |
| *G02F 1/1343* | (2006.01) | |
| *G02F 1/1362* | (2006.01) | |
| *G02F 1/1368* | (2006.01) | |
| *G02F 1/1333* | (2006.01) | |

(52) U.S. Cl.
CPC ............ *G02F 1/1337* (2013.01); *G02F 1/1368* (2013.01); *G02F 1/1396* (2013.01); *G02F 1/13439* (2013.01); *G02F 1/13475* (2013.01); *G02F 1/133512* (2013.01); *G02F 1/136286* (2013.01); *G02F 2001/133302* (2013.01); *G02F 2001/133357* (2013.01); *G02F 2202/28* (2013.01); *G02F 2203/34* (2013.01)

(56) References Cited

U.S. PATENT DOCUMENTS

| | | | | |
|---|---|---|---|---|
| 6,033,742 | A * | 3/2000 | Iwanaga | C09B 1/585 252/299.1 |
| 2001/0040542 | A1 * | 11/2001 | Harada | G02F 1/13473 345/87 |
| 2001/0055080 | A1 * | 12/2001 | Naito | G02F 1/13475 349/79 |
| 2003/0066985 | A1 * | 4/2003 | Hisamitsu | C09K 19/2007 252/299.61 |
| 2005/0190967 | A1 * | 9/2005 | Ok | H04N 9/67 382/167 |
| 2007/0285611 | A1 * | 12/2007 | Nose | G02F 1/133345 349/179 |
| 2008/0094551 | A1 * | 4/2008 | Hayashi | G02F 1/13475 349/106 |
| 2008/0309598 | A1 * | 12/2008 | Doane | G02F 1/13475 345/87 |
| 2009/0279024 | A1 * | 11/2009 | Coates | G02F 1/133509 349/104 |
| 2010/0141689 | A1 * | 6/2010 | Johnson | G06F 3/1423 345/690 |
| 2011/0040542 | A1 * | 2/2011 | Sendhoff | G06F 17/5095 703/8 |
| 2012/0099049 | A1 * | 4/2012 | Yamazaki | G02F 1/133603 349/64 |
| 2012/0274887 | A1 * | 11/2012 | Hwang | G02F 1/13473 349/115 |

FOREIGN PATENT DOCUMENTS

| | | | |
|---|---|---|---|
| CN | 202275248 U | * | 6/2012 |
| CN | 202275248 U | | 6/2012 |
| CN | 102549490 A | | 7/2012 |

* cited by examiner

COLOR LIQUID CRYSTAL DISPLAY PANEL

BACKGROUND OF THE INVENTION

1. Field of the Invention

The present invention relates to the field of liquid crystal display technology, and in particular to a color liquid crystal display panel.

2. The Related Arts

Liquid crystal displays (LCDs) have a variety of advantages, such as thin device body, low power consumption, and being free of radiation, and are thus widely used. Most of the liquid crystal displays that are currently available in the market are backlighting liquid crystal displays, which comprise a liquid crystal display panel and a backlight module. The operation principle of the liquid crystal display panel is that, with liquid crystal molecules interposed between two parallel glass substrates, application of electricity is selectively carried out to control the liquid crystal molecules to change direction in order to refract out light emitting from the backlight module for generating images.

The liquid crystal display panel comprises a color filter (CF) substrate, a thin-film transistor (TFT) substrate, liquid crystal (LC) interposed between the CF substrate and the TFT substrate, and a sealant and the manufacturing process generally comprises: a front stage of array process (including thin film, yellow light, etching, and film stripping), an intermediate stage of cell process (including laminating the TFT substrate and the CF substrate), and a rear stage of assembling process (including mounting of drive ICs and printed circuit board). The front stage of array process generally forms the TFT substrate in order to control the movement of the liquid crystal molecules. The intermediate stage of cell process generally introduces the liquid crystal between the TFT substrate and the CF substrate. The rear stage of assembling process generally integrates the drive ICs and combining the printed circuit board to achieve driving of the liquid crystal molecules to rotate for displaying images.

The liquid crystal display panels that are available in the main stream market can be classified in three categories, including TN (twisted nematic)/STN (super twisted nematic), IPS (in-plane switching)/FFS (fringe field switching), and VA (Vertical Alignment), among which the TN type liquid crystal display panel possesses numerous advantages, including high liquid crystal molecule rotating speed and high response speed, and is thus one of the most widely used entry-level liquid crystal display panels. Referring to FIG. 1, which is a schematic view showing the structure of a conventional TN type liquid crystal display panel, the conventional TN type liquid crystal display panel generally comprises, in a layer stacked arrangement from top to bottom, an upper polarizer 100, a color filter substrate 110, a dye-doped liquid crystal layer 120, a thin-film transistor substrate 130, and a lower polarizer 140, the layers being stacked, sequentially from top to bottom, to constitute a display panel.

To achieve full color displaying, a common practice is to form a color filter substrate on a glass plate of a liquid crystal display panel (which is often a glass plate that is set opposite to the glass plate of the thin-film transistor substrate but can alternatively be the glass plate of the thin-film transistor substrate) through processes of coating, exposure, and development, so as to make use of the principle of spatial color mixture to fulfill full color displaying.

However, the color filter of the color filter substrate allows only lights of a portion of wavebands to pass therethrough and a polarizer must be included for polarization of the light. Consequently, after passing the color filter, the light intensity is reduced to only around 33% of the original level. This is one of the causes that make the optical efficiency of the conventional LCD relatively low. Further, since inclusion of a polarizer and a color filter is necessary, it is adverse to control of the manufacture cost.

SUMMARY OF THE INVENTION

An object of the present invention is to provide a color liquid crystal display panel, which combines a dichroic dye in a liquid crystal material in order to use the dichroic dye to absorb the lights of some colors for realization of color displaying without including conventionally used polarizers and color filters, thereby lowering down the manufacture cost of the liquid crystal display panel and reducing required backlighting brightness and thus enhancing transmittance and optical efficiency.

To achieve the above object, the present invention provides a color liquid crystal display panel, which comprises: a plurality of layers of liquid crystal cell that is arranged parallel to each other and bonding members bonding the plurality of layers of liquid crystal cell. Each of the liquid crystal cells comprises a thin-film transistor substrate, a package substrate, and a dye-doped liquid crystal layer sealed between the thin-film transistor substrate and the package substrate. The dye-doped liquid crystal layer comprises a liquid crystal material, a dichroic dye, and a chiral reagent. The dichroic dye of each of the liquid crystal cells absorbs a light of a predetermined range of wavelength. The plurality of layers of liquid crystal cell respectively absorbs lights of different ranges of wavelength.

The liquid crystal material is a positive nematic liquid crystal material and the bonding members are optically transparent glue or double-sided adhesive tapes.

The thin-film transistor substrate comprises a first transparent substrate, a plurality of gate lines formed on the first transparent substrate, a plurality of data lines formed on the first transparent substrate, an array of thin-film transistors formed on the first transparent substrate, a plurality of pixel electrodes formed on the array of thin-film transistors, a first planarization layer formed on the pixel electrodes and the array of thin-film transistors, and a first alignment layer formed on the first planarization layer.

The first transparent substrate is a glass substrate; the pixel electrodes are made of indium tin oxides; and the first alignment layer is a horizontal alignment layer.

The package substrate comprises a second transparent substrate, black matrixes formed on the second transparent substrate, a second planarization layer formed on the second transparent substrate and the black matrixes, common electrodes formed on the second planarization layer, a second alignment layer formed on the common electrodes, and a photo spacer layer formed on the second alignment layer. The black matrixes, the gate lines, the data lines, and the array of thin-film transistors collectively divide the color liquid crystal display panel into a plurality of pixels.

The second transparent substrate is a glass substrate; the common electrodes are made of indium tin oxides; and the second alignment layer is a horizontal alignment layer.

The liquid crystal material comprises liquid crystal molecules and alignment direction of the first alignment layer and alignment direction of the second alignment layer define therebetween an inclined angle, whereby without being acted upon by a driving voltage, the liquid crystal molecules form a nematic twisted arrangement. The included angle is greater than 0° and less than 180°. The liquid crystal molecules has a twisting angle greater than or equal to 90° and less than 180°.

The liquid crystal material comprises liquid crystal molecules and the dichroic dye comprises dichroic dye molecules, the dichroic dye molecules having a molecular structure similar to a molecular structure of the liquid crystal molecules; the dichroic dye molecules show selective absorptivity of visible light; when a visible light travels in a direction parallel to a major axis of the dichroic dye molecules, the dichroic dye molecules generally show no absorption of the visible light; and when a visible light travels in a direction perpendicular to the major axis of the dichroic dye molecules, the dichroic dye molecules show absorption of the visible light.

When no driving voltage is applied between the thin-film transistor substrate and the package substrate, the liquid crystal molecules and the dichroic dye molecules show a nematic twisted arrangement and the liquid crystal molecules and the dichroic dye molecules have multiple directions of twisted alignment angles, the dichroic dye molecules showing absorption of visible light; and when a driving voltage is applied to the thin-film transistor substrate and the package substrate, the liquid crystal molecules and the dichroic dye molecules are both rotated to a direction substantially perpendicular to a surface of the thin-film transistor substrate and a surface of the package substrate, the dichroic dye molecules showing no absorption of visible light.

The plurality of layers of liquid crystal cell comprises three layers, which are respectively first to third layers of liquid crystal cell. The first-layer liquid crystal cell comprises a dichroic dye that absorbs light in red light wavelength range. The second-layer liquid crystal cell comprises a dichroic dye that absorbs light in green light wavelength range. The third-layer liquid crystal cell comprises a dichroic dye that absorbs light in blue light wavelength range.

The present invention also provides a color liquid crystal display panel, which comprises: a plurality of layers of liquid crystal cell that is arranged parallel to each other and bonding members bonding the plurality of layers of liquid crystal cell, each of the liquid crystal cells comprising a thin-film transistor substrate, a package substrate, and a dye-doped liquid crystal layer sealed between the thin-film transistor substrate and the package substrate, the dye-doped liquid crystal layer comprising a liquid crystal material, a dichroic dye, and a chiral reagent, the dichroic dye of each of the liquid crystal cells absorbing a light of a predetermined range of wavelength, the plurality of layers of liquid crystal cell respectively absorbing lights of different ranges of wavelength;

wherein the liquid crystal material is a positive nematic liquid crystal material and the bonding members are optically transparent glue or double-sided adhesive tapes;

wherein the thin-film transistor substrate comprises a first transparent substrate, a plurality of gate lines formed on the first transparent substrate, a plurality of data lines formed on the first transparent substrate, an array of thin-film transistors formed on the first transparent substrate, a plurality of pixel electrodes formed on the array of thin-film transistors, a first planarization layer formed on the pixel electrodes and the array of thin-film transistors, and a first alignment layer formed on the first planarization layer;

wherein the first transparent substrate is a glass substrate; the pixel electrodes are made of indium tin oxides; and the first alignment layer is a horizontal alignment layer;

wherein the package substrate comprises a second transparent substrate, black matrixes formed on the second transparent substrate, a second planarization layer formed on the second transparent substrate and the black matrixes, common electrodes formed on the second planarization layer, a second alignment layer formed on the common electrodes, and a photo spacer layer formed on the second alignment layer, the black matrixes, the gate lines, the data lines, and the array of thin-film transistors collectively dividing the color liquid crystal display panel into a plurality of pixels; and wherein the second transparent substrate is a glass substrate; the common electrodes are made of indium tin oxides; and the second alignment layer is a horizontal alignment layer.

The liquid crystal material comprises liquid crystal molecules and alignment direction of the first alignment layer and alignment direction of the second alignment layer define therebetween an inclined angle, whereby without being acted upon by a driving voltage, the liquid crystal molecules form a nematic twisted arrangement. The included angle is greater than 0° and less than 180°. The liquid crystal molecules have a twisting angle greater than or equal to 90° and less than 180°.

The liquid crystal material comprises liquid crystal molecules and the dichroic dye comprises dichroic dye molecules, the dichroic dye molecules having a molecular structure similar to a molecular structure of the liquid crystal molecules; the dichroic dye molecules show selective absorptivity of visible light; when a visible light travels in a direction parallel to a major axis of the dichroic dye molecules, the dichroic dye molecules generally show no absorption of the visible light; and when a visible light travels in a direction perpendicular to the major axis of the dichroic dye molecules, the dichroic dye molecules show absorption of the visible light.

When no driving voltage is applied between the thin-film transistor substrate and the package substrate, the liquid crystal molecules and the dichroic dye molecules show a nematic twisted arrangement and the liquid crystal molecules and the dichroic dye molecules have multiple directions of twisted alignment angles, the dichroic dye molecules showing absorption of visible light; and when a driving voltage is applied to the thin-film transistor substrate and the package substrate, the liquid crystal molecules and the dichroic dye molecules are both rotated to a direction substantially perpendicular to a surface of the thin-film transistor substrate and a surface of the package substrate, the dichroic dye molecules showing no absorption of visible light.

The plurality of layers of liquid crystal cell comprises three layers, which are respectively first to third layers of liquid crystal cell. The first-layer liquid crystal cell comprises a dichroic dye that absorbs light in red light wavelength range. The second-layer liquid crystal cell comprises a dichroic dye that absorbs light in green light wavelength range. The third-layer liquid crystal cell comprises a dichroic dye that absorbs light in blue light wavelength range.

The efficacy of the present invention is that the present invention provides a color liquid crystal display panel, which comprises a dichroic dye having a specific absorption spectrum combined in a liquid crystal material to form a dye-doped liquid crystal layer that absorbs lights in a predetermined range of wavelength thereby achieving selective absorption of a light emitting from a backlight source and thus realizing displaying of a color. Further, through stacking a plurality of dye-doped liquid crystal layers that absorb lights in different ranges of wavelength, color displaying can be achieved, whereby color displaying is fulfilled without using a conventionally used polarizer and color filter, so that the manufacture cost of and the requirement for backlighting brightness by the liquid crystal display panel can both be reduced and light transmittal and optic efficiency both enhanced.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

Figure 1:
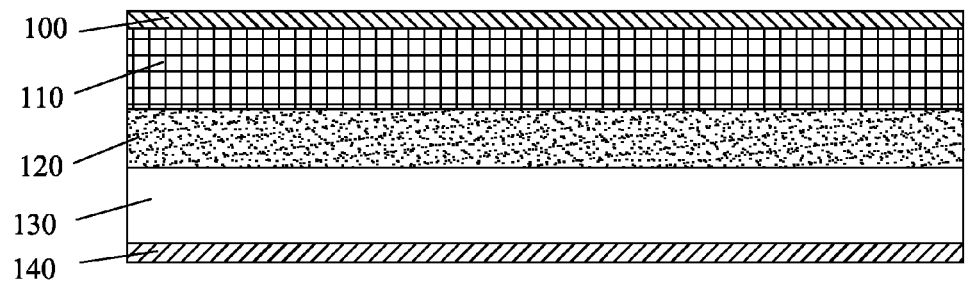
FIG. 1 is a schematic view showing the structure of a conventional TN type color liquid crystal display panel.
Figure 2:
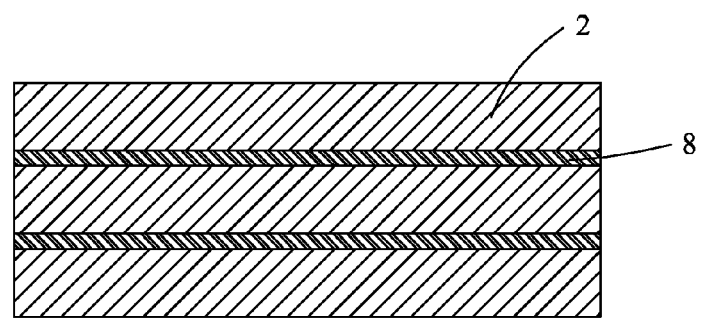
FIG. 2 is a schematic view showing the structure of a color liquid crystal display panel according to the present invention.

Referring to FIGS. 2-5, the present invention provides a color liquid crystal display panel, which comprises: a plurality of layers of liquid crystal cells 2 that is arranged parallel to each other and bonding members 8 bonding the plurality of layers of liquid crystal cells 2. The plurality of layers of liquid crystal cells 2 are TN type liquid crystal cells and each of the liquid crystal cells 2 comprises a thin-film transistor substrate 20, a package substrate 30, and a dye-doped liquid crystal layer 40 sealed between the thin-film transistor substrate 20 and the package substrate 30. The dye-doped liquid crystal layer 40 comprises a liquid crystal material, a dichroic dye, and a chiral reagent. The dichroic dye of each of the liquid crystal cells 2 absorbs light of a predetermined range of wavelength. The plurality of layers of liquid crystal cells 2 respectively absorbs lights of different ranges of wavelength.

Figure 6:
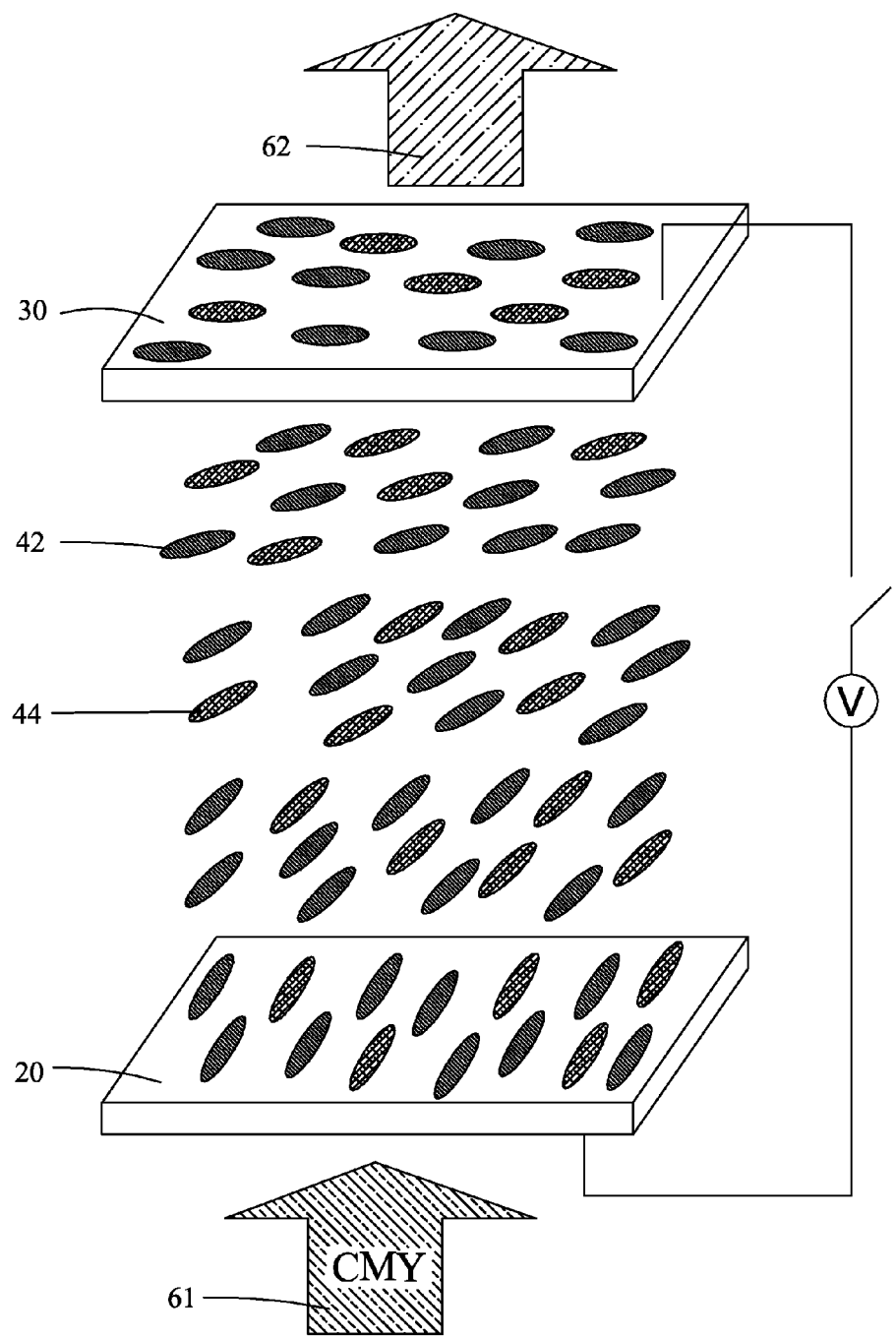
FIGS. 6-7 are schematic views illustrating the principle of displaying a single color with the color liquid crystal display panel according to the present invention.

The liquid crystal material can be a positive nematic liquid crystal material. The chiral reagent is added in the liquid crystal material to help increase elastic potential energy of liquid crystal molecules 42 of the liquid crystal material so as to facilitate rotation of the liquid crystal molecules 42, as shown in FIG. 6. The dichroic dyes absorb lights of predetermined ranges of wavelength. The bonding members 8 can be optically transparent glue, a double-sided adhesive tape, or other transparent bonding members.

Figure 3:
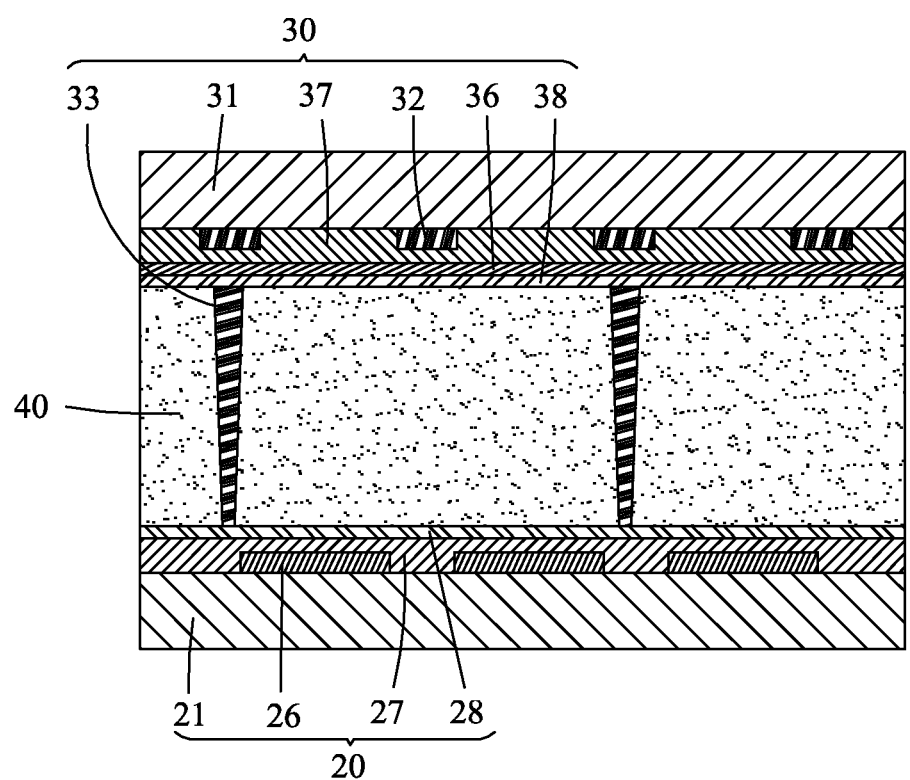
FIG. 3 is a schematic view showing the structure of a liquid crystal cell of FIG. 2.
Figure 4:
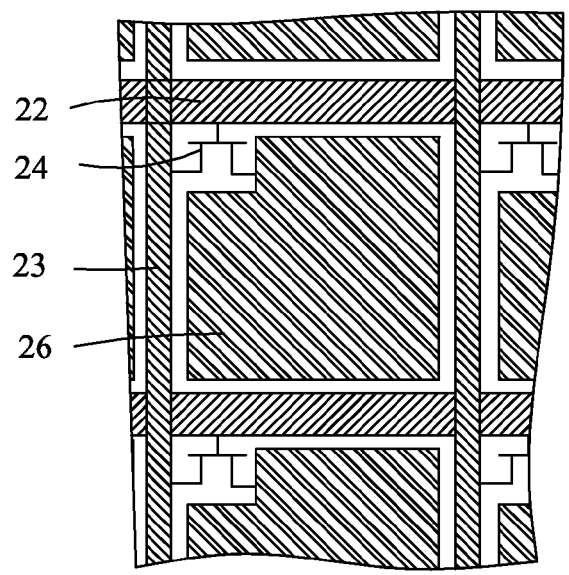
FIG. 4 is a top plan view of a thin-film transistor substrate of FIG. 3.

As shown in FIGS. 3 and 4, the thin-film transistor substrate 20 comprises a first transparent substrate 21, a plurality of gate lines 22 formed on the first transparent substrate 21, a plurality of data lines 23 formed on the first transparent substrate 21, an array of thin-film transistors 24 formed on the first transparent substrate 21, a plurality of pixel electrodes 26 formed on the array of thin-film transistors 24, a first planarization layer 27 formed on the pixel electrodes 26 and the array of thin-film transistors 24, and a first alignment layer 28 formed on the first planarization layer 27.

The first transparent substrate 21 can be a glass substrate or a plastic substrate and is a glass substrate in the instant embodiment.

The thin-film transistors 24 each comprise a gate terminal, a source terminal, and a drain terminal. The gate terminals of the thin-film transistors 24 are electrically connected to the gate lines 22. The source terminals of the thin-film transistors 24 are electrically connected to the data lines 23. The drain terminals of the thin-film transistors 24 are electrically connected to the pixel electrodes 26. The pixel electrodes 26 are preferably made of indium tin oxides. The first alignment layer 28 is a horizontal alignment layer.

Figure 5:
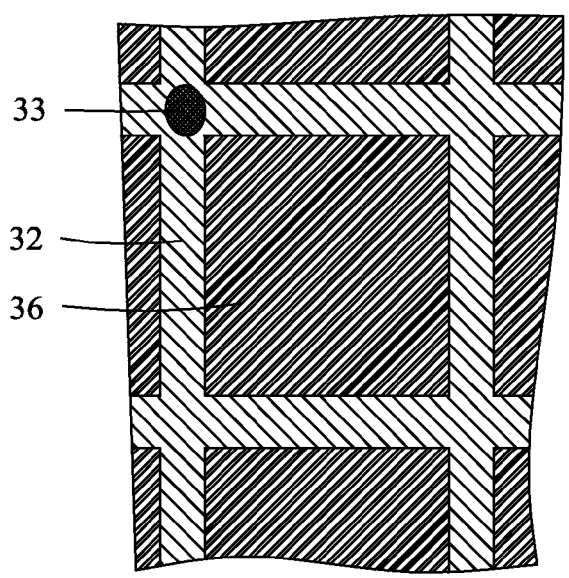
FIG. 5 is a top plan view of a package substrate of FIG. 3.

As shown in FIGS. 3 and 5, the package substrate 30 comprises a second transparent substrate 31, a plurality of black matrixes 32 formed on the second transparent substrate 31, a second planarization layer 37 formed on the second transparent substrate 31 and the black matrixes 32, common electrodes 36 formed on the second planarization layer 37, a second alignment layer 38 formed on the common electrodes 36, and a photo spacer layer 33 formed on the second alignment layer 38. The black matrixes 32, the gate lines 22, the data lines 23, and the array of thin-film transistors 24 collectively divide the color liquid crystal display panel into a plurality of pixels.

The second transparent substrate 31 can be a glass substrate or a plastic substrate and is a glass substrate in the instant embodiment.

The black matrixes 32 function to shield light so as to make the portions where light is not supposed to pass black.

The common electrodes 36 are preferably made of indium tin oxides.

The second alignment layer 38 is a horizontal alignment layer. The alignment direction of the second alignment layer 38 forms an included angle with respect to the alignment direction of the first alignment layer 28. The included angle is greater than 0° and less than 180°. The second alignment layer 38 and the first alignment layer 28 make the liquid crystal molecules and molecules of the dichroic dye form a nematic twisted arrangement in an initial condition and the twisting angle is greater than or equal to 90°. In other words, even there is no driving voltage applied to the thin-film transistor substrate 20 and the package substrate 30, the liquid crystal molecules 42 and the dichroic dye molecules 44 still show a twisted arrangement with the twisting angle being 90° or exceeding 90° and having multiple-directional orientation angles, as shown in FIG. 6.

The photo spacer layer 33 functions to keep a predetermined distance between the thin-film transistor substrate 20 and the package substrate 30 in order to allow for uniform distribution of the molecules of the dye-doped liquid crystal layer 40 between the thin-film transistor substrate 20 and the package substrate 30 and prevent image blurring caused by non-uniform thickness of liquid crystal.

Figure 7:
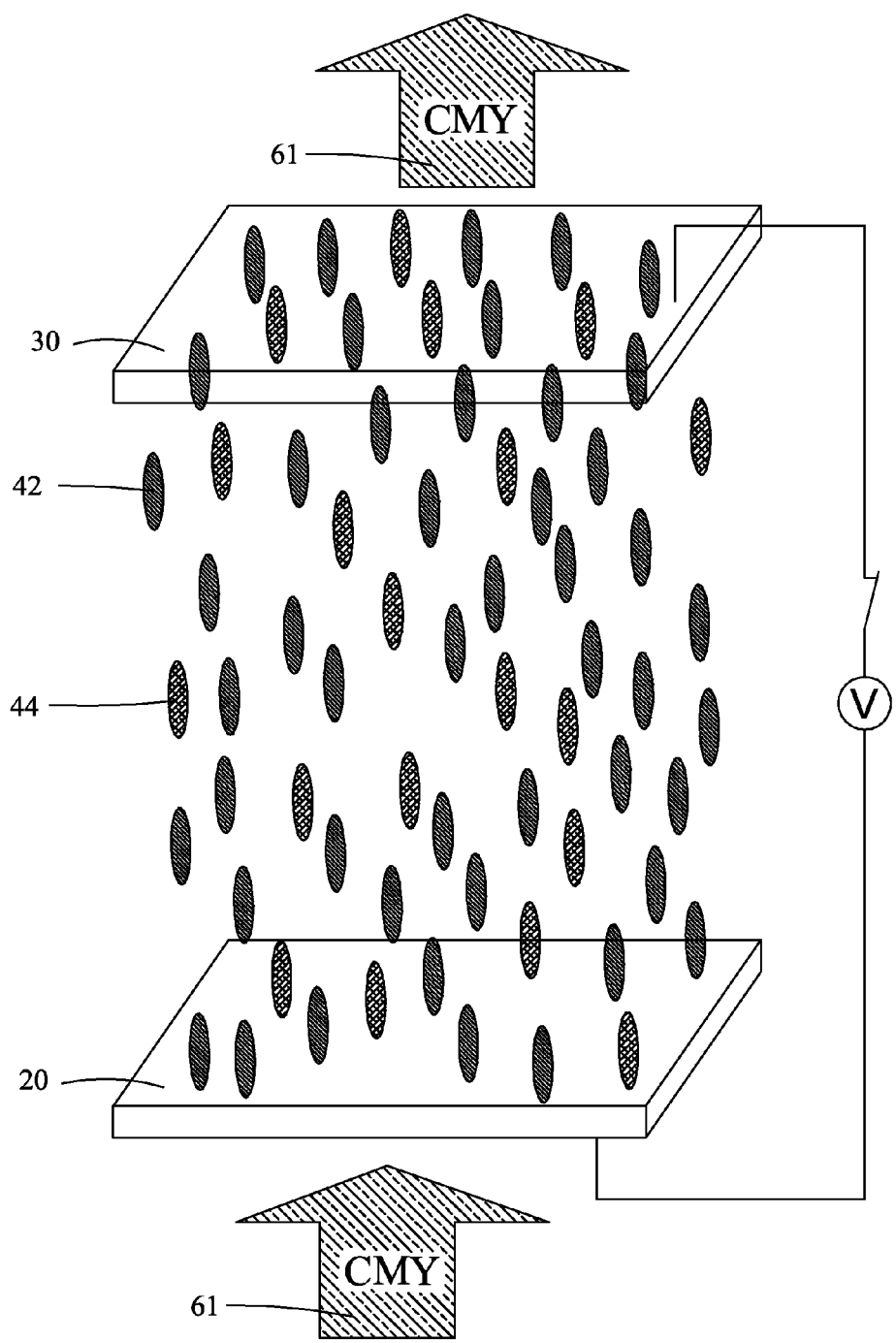

Referring to FIGS. 6-7, the principle of displaying a single color with the color liquid crystal display panel of the present invention is illustrated. The dye-doped liquid crystal layer 40 is formed by dissolving a predetermined amount of the dichroic dye in the liquid crystal material. The liquid crystal material comprises liquid crystal molecules 42 and the dichroic dye comprises dichroic dye molecules 44. The dichroic dye molecules 44 and the liquid crystal molecules 42 have similar molecular structures and the dichroic dye molecules 44 show selective absorptivity of visible light. When a visible light travels in a direction parallel to a major axis of the dichroic dye molecules 44, the dichroic dye molecules 44 generally do not absorb the visible light. When the visible light travels in a direction perpendicular to the major axis of the dichroic dye molecules 44, the dichroic dye molecules 44 show strong absorption of the visible light. Thus, through controlling an included angle between the dichroic dye molecules 44 and a light emitting from a backlight source, it is possible to achieve an effect of adjusting transmitting light intensity by adjusting the absorbance of the dichroic dye molecules 44 with respect to the light from the backlight source, thereby realizing the purposes of displaying various grey levels.

As shown in FIG. 6, when no driving voltage is applied to the thin-film transistor substrate 20 and the package substrate 30, the liquid crystal molecules 42 and the dichroic dye molecules 44 show a nematic twisted arrangement having a twisting angle of 90° or more than 90° and possess multiple directions of aligning angles. Since both the first alignment layer 28 and the second alignment layer 38 are horizontal alignment layers, the dichroic dye molecules 44 shows absorbability of light 61 that gets incident to a surface of the thin-film transistor substrate 20 or a surface of the package substrate 30 and the unabsorbed light is allowed to transmit through the liquid crystal cell 2. Due to a dichroic dye having a unique absorption spectrum, the transmitting light 62 may show a specific color thereby realizing color displaying. Thus, adding different dichroic dyes in the liquid crystal material provides different absorption spectra and thus, the light entering human eyes displays different colors. By selecting different types of dichroic dyes to be mixed with the liquid crystal materials of different dye-doped liquid crystal layers 40, the purposes of displaying different colors can be achieved.

As shown in FIG. 7, when a driving voltage is applied to the thin-film transistor substrate 20 and the package substrate 30, the liquid crystal molecules 42 and the dichroic dye molecules 44, under the action of the electric field, are caused to rotate to be eventually aligned in a direction perpendicular to the surface of the thin-film transistor substrate 20 or the package substrate 30. The liquid crystal molecules 42 generally absorbs no visible light and since a major axis of the dichroic dye molecules 44 is parallel to a traveling direction of the light emitting from the backlight source (not shown), the dichroic dye molecules 44 generally do not absorb the light 61 emitting from the backlight source. Thus, under the condition that a driving voltage is applied to the thin-film transistor substrate 20 and the package substrate 30, the light 61 emitting from the backlight source can mostly transmit through the liquid crystal display panel, so that the entire liquid crystal display panel shows a bright state.

The color liquid crystal display panel is a TN type liquid crystal display panel.

Referring to FIGS. 8-12, the principle of color displaying with the color liquid crystal display panel according to an embodiment of the present invention is illustrated. In the instant embodiment, the color liquid crystal display panel comprises three layers of liquid crystal cell, which are respectively first to third layers of liquid crystal cell 3, 4, 5. The first-layer liquid crystal cell 3 contains a dichroic dye that absorbs light in red light wavelength range. The second-layer liquid crystal cell 4 contains a dichroic dye that absorbs light in green light wavelength range. The third-layer liquid crystal cell 5 contains a dichroic dye that absorbs light in blue light wavelength range.

Figure 8:
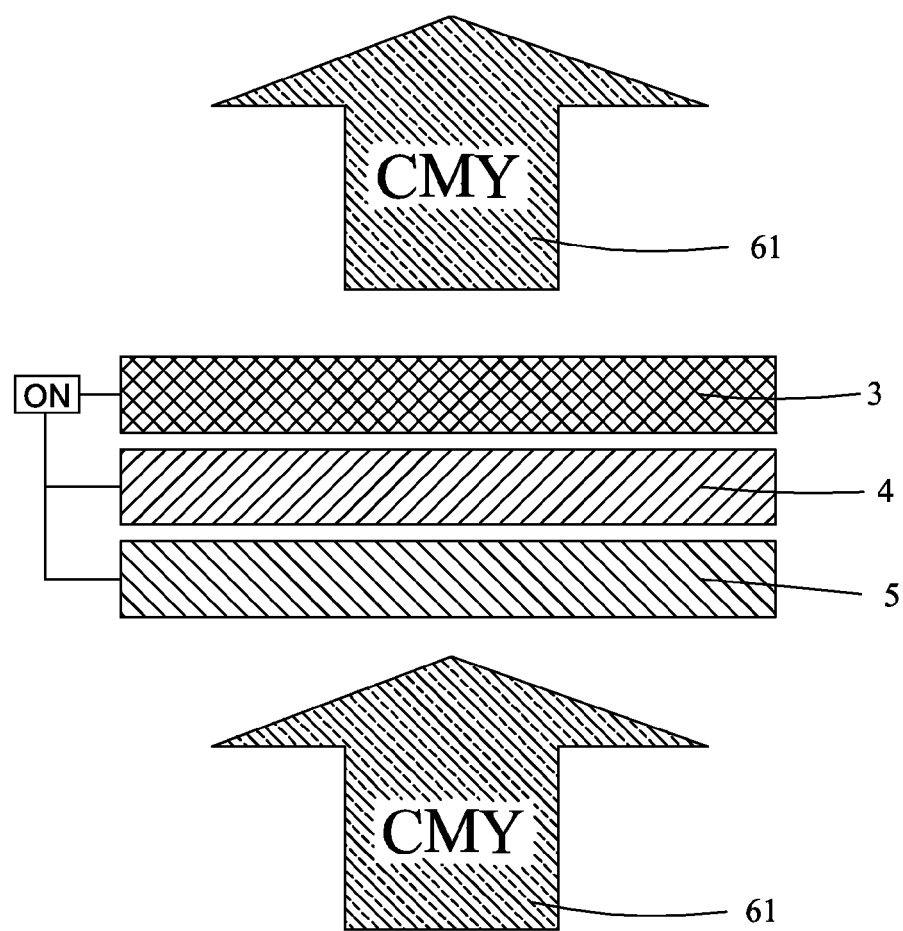
FIGS. 8-12 are schematic views illustrating the principle of color displaying according to a preferred embodiment of the color liquid crystal display panel according to the present invention.

As shown in FIG. 8, when a driving voltage is applied between the two substrates of the liquid crystal cell of each of the three layers, meaning the liquid crystal cells of the three layers being all set in an ON state, the light 61 emitting from the backlight source is generally not absorbed and thus the light 61 emitting from the backlight source mostly transmits through the liquid crystal display panel, making the entire liquid crystal display panel in a bright state.

Figure 9:
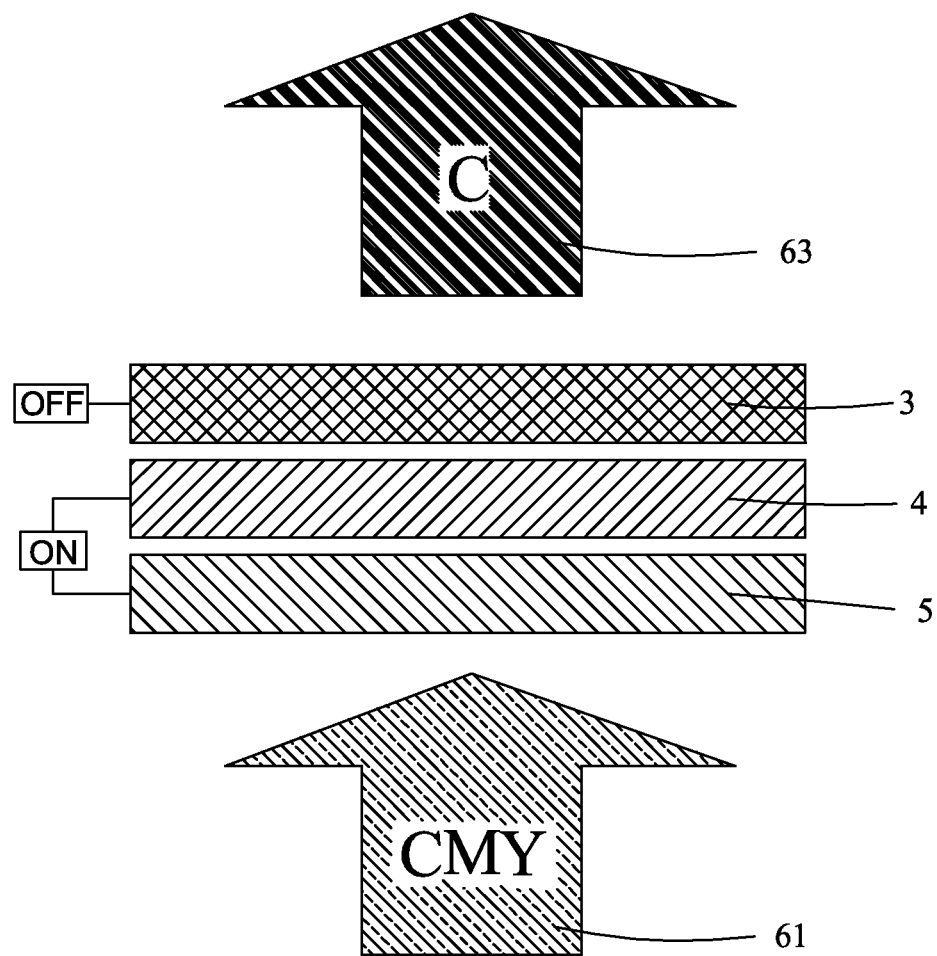

As shown in FIG. 9, when there is only the two substrates of the first-layer liquid crystal cell 3 receiving no driving voltage applied therebetween, meaning only the first-layer liquid crystal cell 3 being set in an OFF state, only the red light is absorbed and lights of other colors are allowed to transmit through the liquid crystal display panel, whereby the transmitting lights are mixed with each other to form a cyan light 63. Thus, when there is only the first-layer liquid crystal cell 3 is in the OFF state, the liquid crystal display panel displays a cyan color.

Figure 10:
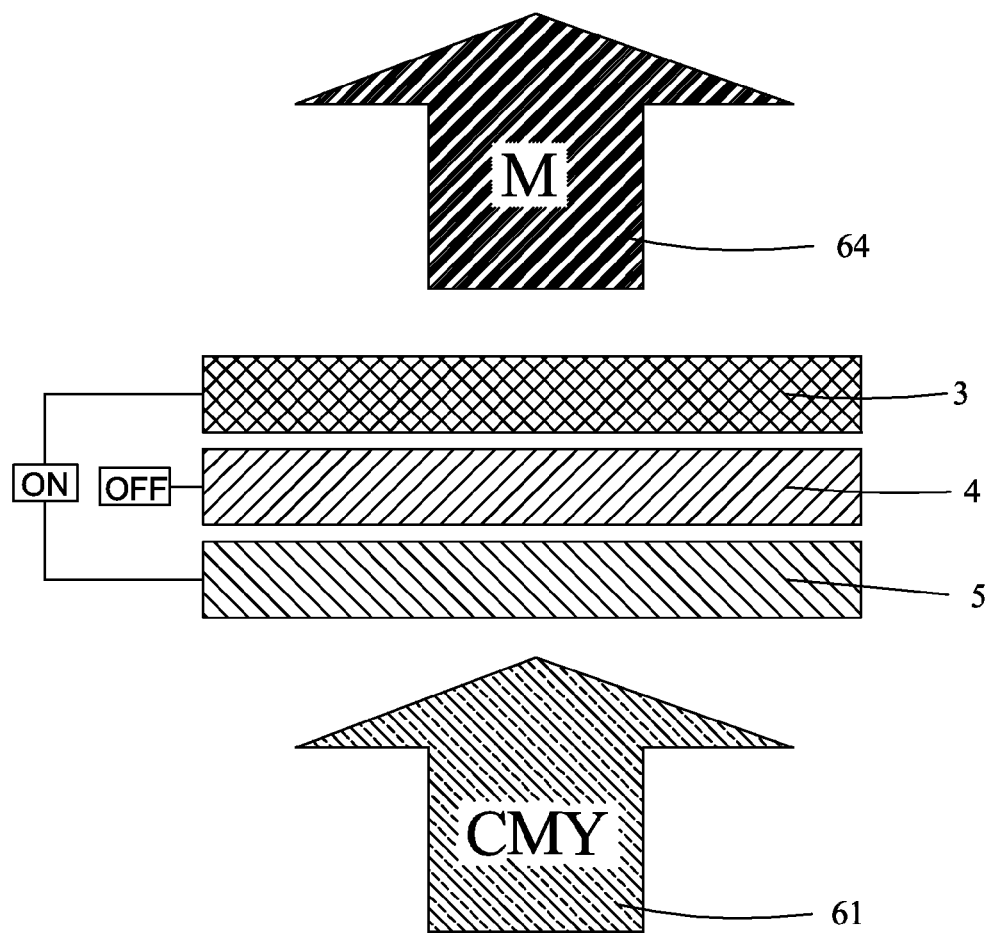

As shown in FIG. 10, when there is only the two substrates of the second-layer liquid crystal cell 4 receiving no driving voltage applied therebetween, meaning only the second-layer liquid crystal cell 4 being set in an OFF state, only the green light is absorbed and lights of other colors are allowed to transmit through the liquid crystal display panel, whereby the transmitting lights are mixed with each other to form a magenta light 64. Thus, when there is only the second-layer liquid crystal cell 4 is in the OFF state, the liquid crystal display panel displays a magenta color.

Figure 11:
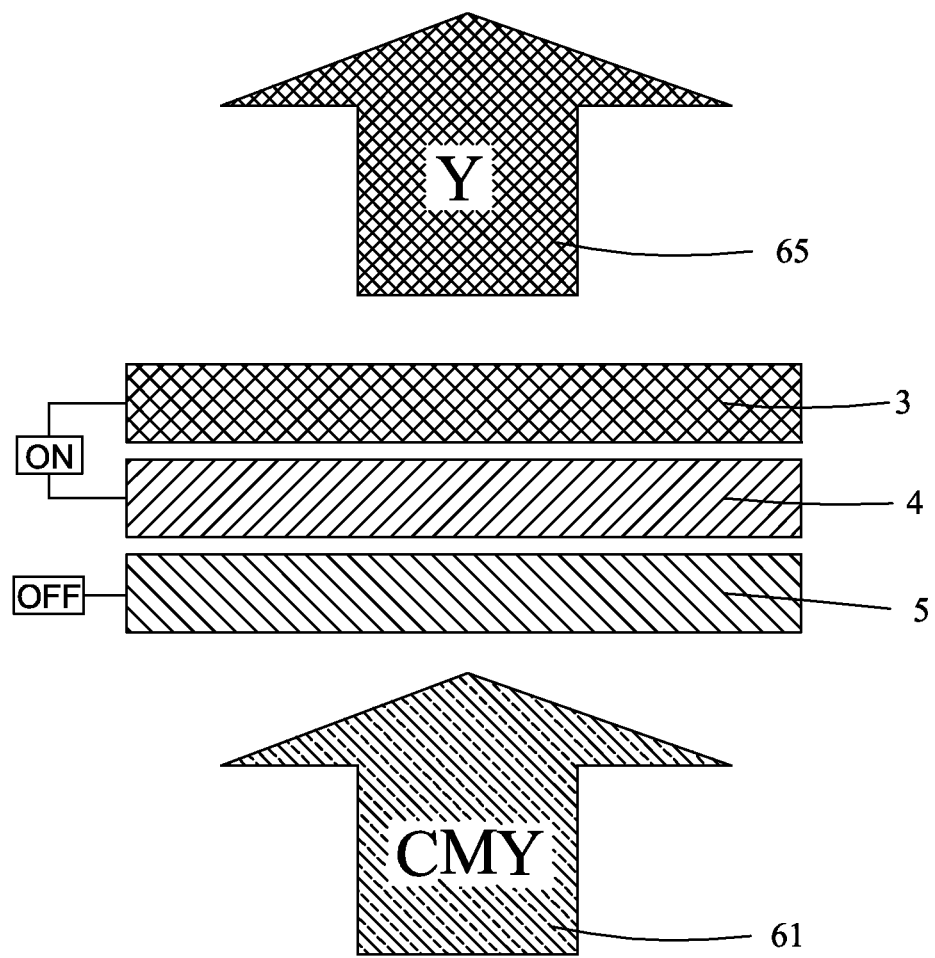

As shown in FIG. 11, when there is only the two substrates of the third-layer liquid crystal cell 5 receiving no driving voltage applied therebetween, meaning only the third-layer liquid crystal cell 5 being set in an OFF state, only the blue light is absorbed and lights of other colors are allowed to transmit through the liquid crystal display panel, whereby the transmitting lights are mixed with each other to form a yellow light 65. Thus, when there is only the third-layer liquid crystal cell 5 is in the OFF state, the liquid crystal display panel displays a yellow color.

Figure 12:
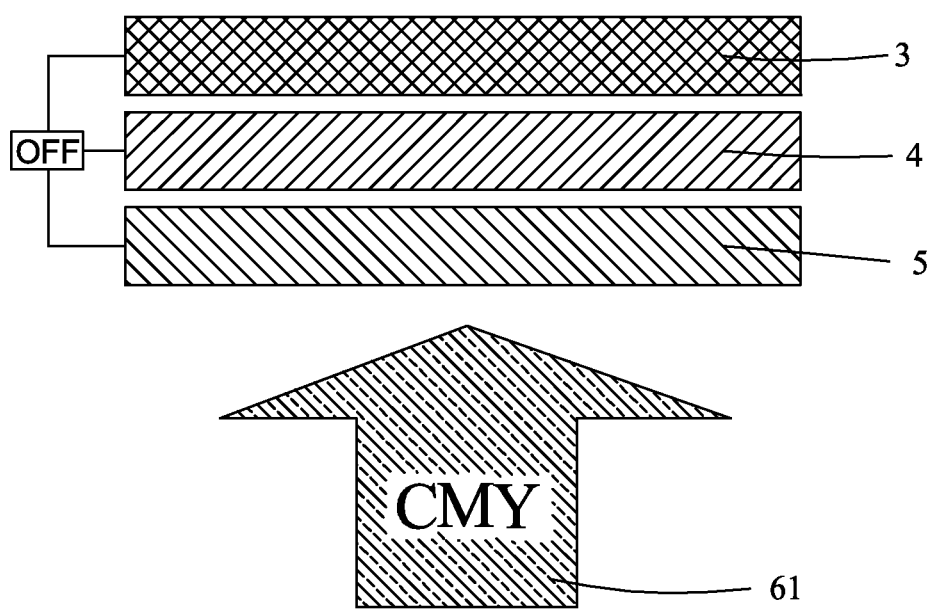

As shown in FIG. 12, when no driving voltage is applied between the two substrates of the liquid crystal cell of each of the three layers, meaning the liquid crystal cells of the three layers being all set in an OFF state, the red light, the green light, and the blue light are all absorbed. Since the dichroic dyes of the liquid crystal cells of the layers have different absorption spectra, superimposing the absorption spectra of the three dichroic dyes substantially covers the entire visible waveband so that the light 61 emitting from the backlight source is mostly absorbed, making the entire liquid crystal display panel in a dark state.

Figure 13:
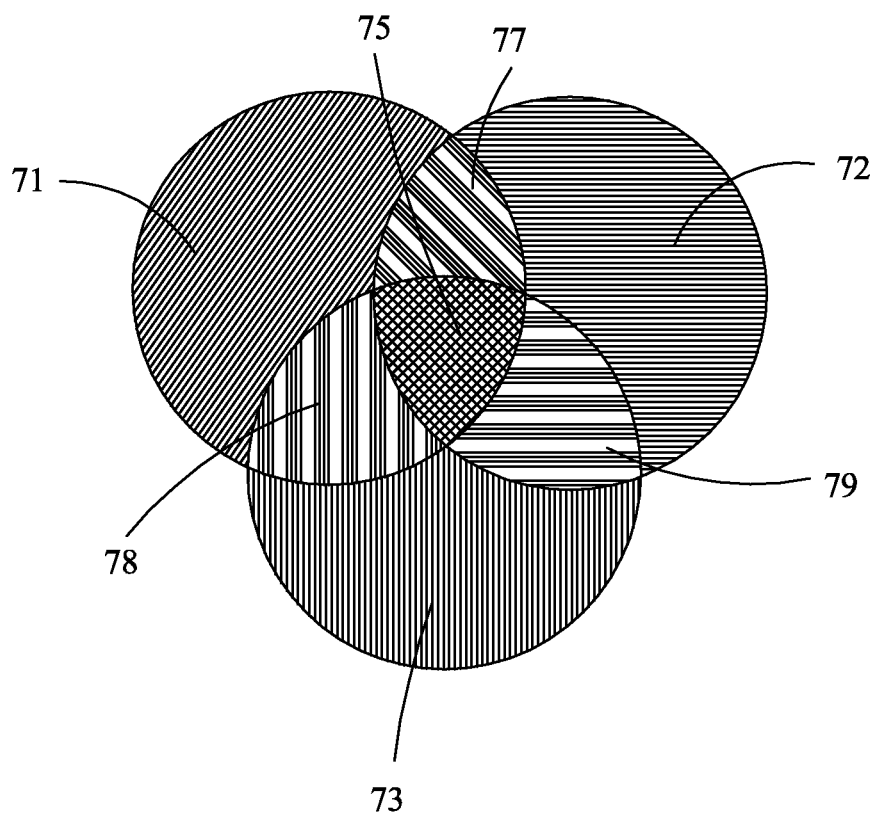
FIG. 13 is a schematic view illustrating the principle of color subtraction.

The liquid crystal display panel according to the present invention may further apply color subtraction principle to achieve the displaying of various colors thereby fulfilling color displaying. The principle of color subtraction is illustrated in FIG. 13, where mixture of cyan 71 and magenta 72 gives red 77; mixture of cyan 71 and yellow 73 gives green 78; mixture of magenta 72 and yellow 73 gives blue 79; and mixture of the three colors of cyan 71, magenta 72, and yellow 73 gives black 75. Thus, in the instant embodiment, selective application of a driving voltage can be made between the two substrates of the first-layer liquid crystal cell 3, the second-layer liquid crystal cell 4, and the third-layer liquid crystal cell 5 to generate a light of the mixture of two or more than two colors, thereby achieving color displaying with the liquid crystal display panel.

In summary, the present invention provides a color liquid crystal display panel, which comprises a dichroic dye having a specific absorption spectrum combined in a liquid crystal material to form a dye-doped liquid crystal layer that absorbs lights in a predetermined range of wavelength thereby achieving selective absorption of a light emitting from a backlight source and thus realizing displaying of a color. Further, through stacking a plurality of dye-doped liquid crystal layers that absorb lights in different ranges of wavelength, color displaying can be achieved, whereby color displaying is fulfilled without using a conventionally used polarizer and color filter, so that the manufacture cost of and the requirement for backlighting brightness by the liquid crystal display panel can both be reduced and light transmittal and optic efficiency both enhanced.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A color liquid crystal display panel, comprising: a plurality of layers of liquid crystal cell that is arranged parallel to each other and bonding members bonding the plurality of layers of liquid crystal cell, each of the liquid crystal cells comprising a thin-film transistor substrate, a package substrate, and a dye-doped liquid crystal layer sealed between the thin-film transistor substrate and the package substrate, the dye-doped liquid crystal layer comprising a liquid crystal material, a dichroic dye, and a chiral reagent, the dichroic dye of each of the liquid crystal cells absorbing a light of a predetermined range of wavelength, the plurality of layers of liquid crystal cell respectively absorbing lights of different ranges of wavelength, wherein multiple ones of the plurality of layers of liquid crystal cell simultaneously allow wavelengths of light associated therewith to pass therethrough from a first side of the color liquid crystal panel to an opposite, second side so as to form a color of mixture of the passing wavelengths of light at the second side.

2. The color liquid crystal display panel as claimed in claim 1, wherein the liquid crystal material is a positive nematic liquid crystal material and the bonding members are optically transparent glue or double-sided adhesive tapes.

3. The color liquid crystal display panel as claimed in claim 1, wherein the thin-film transistor substrate comprises a first transparent substrate, a plurality of gate lines formed on the first transparent substrate, a plurality of data lines formed on the first transparent substrate, an array of thin-film transistors formed on the first transparent substrate, a plurality of pixel electrodes formed on the array of thin-film transistors, a first planarization layer formed on the pixel electrodes and the array of thin-film transistors, and a first alignment layer formed on the first planarization layer.

4. The color liquid crystal display panel as claimed in claim 3, wherein the first transparent substrate is a glass substrate; the pixel electrodes are made of indium tin oxides; and the first alignment layer is a horizontal alignment layer.

5. The color liquid crystal display panel as claimed in claim 3, wherein the package substrate comprises a second transparent substrate, black matrixes formed on the second transparent substrate, a second planarization layer formed on the second transparent substrate and the black matrixes, common electrodes formed on the second planarization layer, a second alignment layer formed on the common electrodes, and a photo spacer layer formed on the second alignment layer, the black matrixes, the gate lines, the data lines, and the array of thin-film transistors collectively dividing the color liquid crystal display panel into a plurality of pixels.

6. The color liquid crystal display panel as claimed in claim 5, wherein the second transparent substrate is a glass substrate; the common electrodes are made of indium tin oxides; and the second alignment layer is a horizontal alignment layer.

7. The color liquid crystal display panel as claimed in claim 5, wherein the liquid crystal material comprises liquid crystal molecules, the first alignment layer having a first alignment direction, the second alignment layer having a second alignment direction, the first and second alignment directions defining therebetween an inclined angle, whereby without being acted upon by a driving voltage, the liquid crystal molecules form a nematic twisted arrangement, the inclined angle between the first and second alignment directions being greater than 0° and less than 180°, the liquid crystal molecules having a twisting angle greater than or equal to 90° and less than 180°.

8. The color liquid crystal display panel as claimed in claim 1, wherein the liquid crystal material comprises liquid crystal molecules and the dichroic dye comprises dichroic dye molecules, the dichroic dye molecules having a molecular structure similar to a molecular structure of the liquid crystal molecules; the dichroic dye molecules show selective absorptivity of visible light; when a visible light travels in a direction parallel to a major axis of the dichroic dye molecules, the dichroic dye molecules generally show no absorption of the visible light; and when a visible light travels in a direction perpendicular to the major axis of the dichroic dye molecules, the dichroic dye molecules show absorption of the visible light.

9. The color liquid crystal display panel as claimed in claim 8, wherein when no driving voltage is applied between the thin-film transistor substrate and the package substrate, the liquid crystal molecules and the dichroic dye molecules show a nematic twisted arrangement, the liquid crystal molecules and the dichroic dye molecules having multiple directions of twisted alignment angles, the dichroic dye molecules showing absorption of visible light; when a driving voltage is applied to the thin-film transistor substrate and the package substrate, the liquid crystal molecules and the dichroic dye molecules are both rotated to a direction substantially perpendicular to a surface of the thin-film transistor substrate and a surface of the package substrate, the dichroic dye molecules showing no absorption of visible light.

10. The color liquid crystal display panel as claimed in claim 1, wherein the plurality of layers of liquid crystal cell comprises three layers, which are respectively first to third layers of liquid crystal cell, the first-layer liquid crystal cell comprising a dichroic dye that absorbs light in red light wavelength range, the second-layer liquid crystal cell comprising a dichroic dye that absorbs light in green light wavelength range, the third-layer liquid crystal cell comprising a dichroic dye that absorbs light in blue light wavelength range.

11. A color liquid crystal display panel, comprising: a plurality of layers of liquid crystal cell that is arranged parallel to each other and bonding members bonding the plurality of layers of liquid crystal cell, each of the liquid crystal cells comprising a thin-film transistor substrate, a package substrate, and a dye-doped liquid crystal layer sealed between the thin-film transistor substrate and the package substrate, the dye-doped liquid crystal layer comprising a liquid crystal material, a dichroic dye, and a chiral reagent, the dichroic dye of each of the liquid crystal cells absorbing a light of a predetermined range of wavelength, the plurality of layers of liquid crystal cell respectively absorbing lights of different ranges of wavelength, wherein multiple ones of the plurality of layers of liquid crystal cell simultaneously allow wavelengths of light associated therewith to pass therethrough from a first side of the color liquid crystal panel to an opposite, second side so as to form a color of mixture of the passing wavelengths of light at the second side;

wherein the liquid crystal material is a positive nematic liquid crystal material and the bonding members are optically transparent glue or double-sided adhesive tapes;

wherein the thin-film transistor substrate comprises a first transparent substrate, a plurality of gate lines formed on the first transparent substrate, a plurality of data lines formed on the first transparent substrate, an array of thin-film transistors formed on the first transparent substrate, a plurality of pixel electrodes formed on the array of thin-film transistors, a first planarization layer formed on the pixel electrodes and the array of thin-film transistors, and a first alignment layer formed on the first planarization layer;

wherein the first transparent substrate is a glass substrate; the pixel electrodes are made of indium tin oxides; and the first alignment layer is a horizontal alignment layer;

wherein the package substrate comprises a second transparent substrate, black matrixes formed on the second transparent substrate, a second planarization layer formed on the second transparent substrate and the black matrixes, common electrodes formed on the second planarization layer, a second alignment layer formed on the common electrodes, and a photo spacer layer formed on the second alignment layer, the black matrixes, the gate lines, the data lines, and the array of thin-film transistors collectively dividing the color liquid crystal display panel into a plurality of pixels; and wherein the second transparent substrate is a glass substrate; the common electrodes are made of indium tin oxides; and the second alignment layer is a horizontal alignment layer.

12. The color liquid crystal display panel as claimed in claim 11, wherein the liquid crystal material comprises liquid crystal molecules, the first alignment layer having a first alignment direction, the second alignment layer having a second alignment direction, the first and second alignment directions defining therebetween an inclined angle, whereby without being acted upon by a driving voltage, the liquid crystal molecules form a nematic twisted arrangement, the inclined angle between the first and second alignment directions being greater than 0° and less than 180°, the liquid crystal molecules having a twisting angle greater than or equal to 90° and less than 180°.

13. The color liquid crystal display panel as claimed in claim 11, wherein the liquid crystal material comprises liquid crystal molecules and the dichroic dye comprises dichroic dye molecules, the dichroic dye molecules having a molecular structure similar to a molecular structure of the liquid crystal molecules; the dichroic dye molecules show selective absorptivity of visible light; when a visible light travels in a direction parallel to a major axis of the dichroic dye molecules, the dichroic dye molecules generally show no absorption of the visible light; and when a visible light travels in a direction perpendicular to the major axis of the dichroic dye molecules, the dichroic dye molecules show absorption of the visible light.

14. The color liquid crystal display panel as claimed in claim 13, wherein when no driving voltage is applied between the thin-film transistor substrate and the package substrate, the liquid crystal molecules and the dichroic dye molecules show a nematic twisted arrangement, the liquid crystal molecules and the dichroic dye molecules having multiple directions of twisted alignment angles, the dichroic dye molecules showing absorption of visible light; when a driving voltage is applied to the thin-film transistor substrate and the package substrate, the liquid crystal molecules and the dichroic dye molecules are both rotated to a direction substantially perpendicular to a surface of the thin-film transistor substrate and a surface of the package substrate, the dichroic dye molecules showing no absorption of visible light.

15. The color liquid crystal display panel as claimed in claim 11, wherein the plurality of layers of liquid crystal cell comprises three layers, which are respectively first to third layers of liquid crystal cell, the first-layer liquid crystal cell comprising a dichroic dye that absorbs light in red light wavelength range, the second-layer liquid crystal cell comprising a dichroic dye that absorbs light in green light wavelength range, the third-layer liquid crystal cell comprising a dichroic dye that absorbs light in blue light wavelength range.

* * * * *